United States Patent [19]

Smith

[11] 4,337,425

[45] Jun. 29, 1982

[54] SPEED CONTROL TRIGGER SWITCH

[75] Inventor: Jackson H. Smith, Union Grove, Ala.

[73] Assignee: Eaton Corporation, Cleveland, Ohio

[21] Appl. No.: 155,692

[22] Filed: Jun. 2, 1980

[51] Int. Cl.[3] .......................... H02P 7/24; H01H 1/22

[52] U.S. Cl. .......................... 318/345 G; 318/345 R; 318/305; 200/16 A; 200/244; 200/340; 200/157; 200/159 R

[58] Field of Search ................ 200/16 R, 16 A, 16 C, 200/86.5, 340, 337, 332, 157, 153 E, 249, 159 R, 4; 318/345 G, 345 R, 347, 349, 301, 305

[56] References Cited

U.S. PATENT DOCUMENTS

| | | | |
|---|---|---|---|
| 922,034 | 5/1909 | Peterson | 200/340 X |
| 970,264 | 9/1910 | Peterson | 200/340 X |
| 1,023,224 | 4/1912 | Peterson | 200/337 |
| 3,329,842 | 7/1967 | Brown | 318/345 G |
| 3,484,632 | 12/1969 | Opalenik et al. | 318/345 G |
| 3,648,142 | 3/1972 | Corey et al. | 318/345 G |
| 3,660,742 | 5/1972 | Gawron | 318/345 G |
| 3,755,640 | 8/1973 | Kaman et al. | 200/157 |
| 3,775,576 | 11/1973 | Brown | 200/157 |
| 3,777,092 | 12/1973 | Yeske | 200/337 |
| 3,895,205 | 7/1975 | Tharp | 200/340 |
| 4,136,270 | 1/1979 | Wernet et al. | 200/340 |
| 4,137,490 | 1/1979 | Brozoski et al. | 318/345 G X |
| 4,179,644 | 12/1979 | Vassos | 318/345 R X |
| 4,205,434 | 6/1980 | Brozoski et al. | 318/345 G |

FOREIGN PATENT DOCUMENTS

| | | | |
|---|---|---|---|
| 2103494 | 4/1979 | Fed. Rep. of Germany | 200/340 |

*Primary Examiner*—J. V. Truhe
*Assistant Examiner*—Richard M. Moose
*Attorney, Agent, or Firm*—C. H. Grace; L. G. Vande Zande

[57] ABSTRACT

A speed control trigger switch of a double-pole configuration. One pole of said switch is an ON-OFF switch, while the other pole controls the speed control circuit. A contact carrier block (20) carries the two movable contacts (22,38), one for each pole of the switch. As the carrier block begins to move, the contact for the speed control side closes the speed control circuit by contacting two contacts, a contact/terminal (26) and a heat sink (24). As the block continues to move due to continued pressure on the trigger (16), the speed of the motor controlled by the switch continues to increase until the FULL-ON position is reached when the movable contact (22) closes the gap between the two contact-/terminals (26,36). The contact portion (36*a*) of that contact/terminal is located between the other contact-/terminal (26) and the heat sink (24) for efficiency and compactness of design.

5 Claims, 7 Drawing Figures

SPEED CONTROL TRIGGER SWITCH

BACKGROUND OF THE INVENTION

This invention relates to electrical switches for controlling motors, and in particular to those switches which control the speed of those motors.

While speed control switches are generally well-known in the art, in most of these switches either the motion of the trigger is in the direction of the longest axis of the switch body, as in Brown U.S. Pat. No. 3,775,576, issued Nov. 27, 1973, or the switch is of the overhanging trigger type, as disclosed in Yeske U.S. Pat. No. 3,777,092. While these switches may have been useful for their intended purposes, this invention relates to improvements thereover.

SUMMARY OF THE INVENTION

It is an object of this invention to provide an improved speed control switch.

Another object of the invention is to provide a speed control switch wherein the direction of motion of the trigger is perpendicular to the longest axis of the switch body.

A more specific object of this invention is to provide a speed control switch as described above having two poles, one of which is an ON-OFF switch while the other pole is part of the speed control circuit.

Another specific object of the invention is to provide a speed control switch as described above wherein the switch pole which is part of the speed control circuit has its shunting or "FULL ON" contact between the two speed control contacts.

Other objects and advantages of the invention will appear hereinafter.

DESCRIPTION OF THE PREFERRED EMBODIMENT

Figure 1:
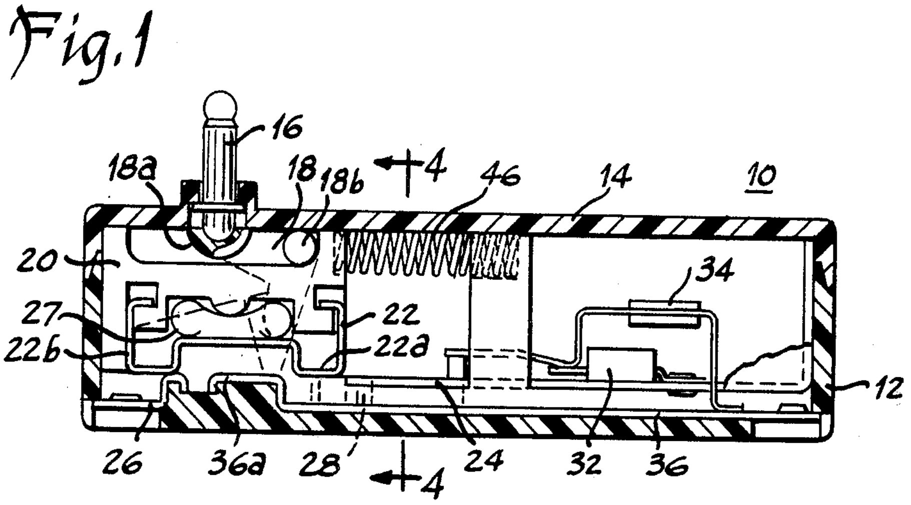
FIG. 1 is a longitudinal section view through the body of the speed control trigger switch of this invention taken substantially along the line 1—1 of FIG. 4, but showing the internal components thereof in elevation.
Figure 2:
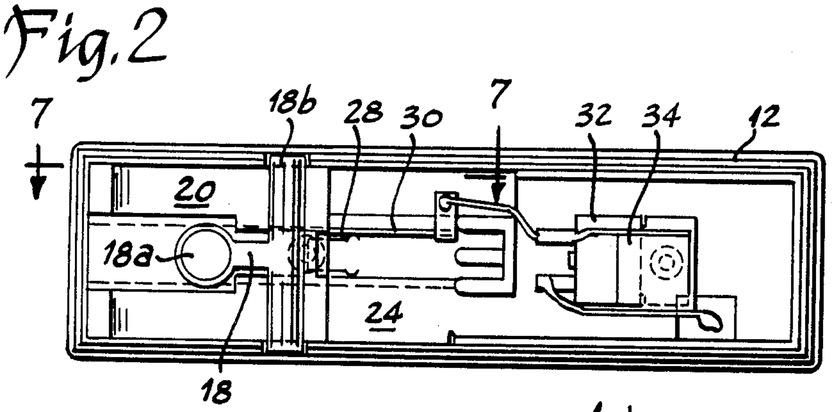
FIG. 2 is a top view of the switch of FIG. 1 with the cover and trigger removed.

Referring to FIGS. 1 and 2, a switch body 10 is shown, which includes a base 12 and a cover 14. A plunger member or trigger 16 passes through an aperture in cover 14, to rest on motion-translating lever 18, on a cup-shaped portion **18*a* thereof. A downward pressure on trigger 16 causes lever 18 to rotate about its roller portion 18*b*, which in turn causes tab portion 18*c***

Figure 4:
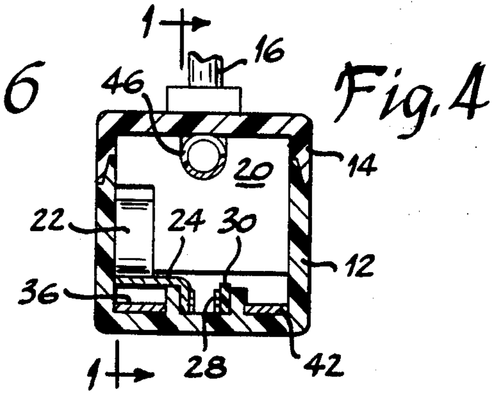
FIG. 4 is a transverse cross-sectional view of the switch of FIG. 1 taken substantially along the line 4—4 of FIG. 1.
Figure 3:
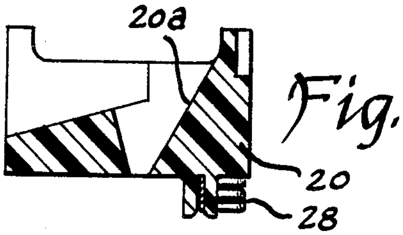
FIG. 3 is a longitudinal cross-sectional view of the contact carrier block of the switch of FIG. 1.

(see FIG. 7) of lever 18 to exert pressure on inclined surface **20*a* of contact carrier block 20, shown most clearly in FIG. 3. Block 20 then slides to the right as shown in FIGS. 1 and 2, with the forward end 22*a* of contact 22 sliding onto heat sink 24, also shown in FIG. 4, while the opposite end 22*b* slides onto contact/terminal 26. This closes the speed control circuit. Spring 27 maintains contact pressure. The current path for this circuit is as follows: Contact/terminal 26 to contact 22 to heat sink 24 to brush clip 28 to resistance strip 30 to SCR 32 and capacitor 34 to contact/terminal 36**. This basic electrical circuit is shown in Brozoski et al. U.S. Pat. No. 4,137,490, issued Jan. 30, 1979, and in particular at FIG. 7 and col. 5, lines 12–32 of said patent, which is hereby incorporated by reference.

Figure 5:
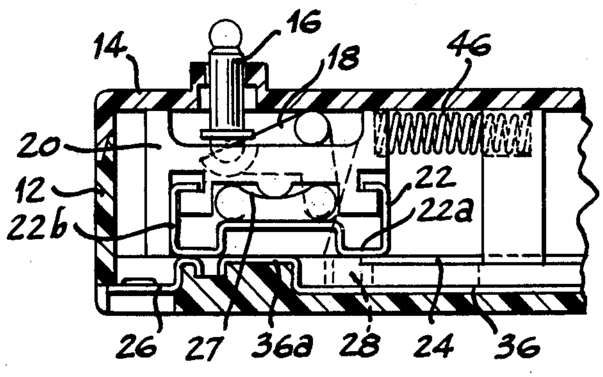
FIG. 5 is a fragmentary view similar to FIG. 1 showing only the left-hand end thereof and illustrating the trigger in the fully depressed position.

As block 20 continues to move to the right, the FULL-ON position is reached when end **22*b* of contact 22 closes the gap between contacts/terminals 26 and 36, as shown in FIG. 5. The resistor strip 30, SCR 32 and capacitor 34 are thus shunted out of the circuit, as current passes directly from one terminal to the other. Hence the placement of the shunting contact portion 36*a* of contact/terminal 36 is between the contacts 24 and 26** of the speed control circuit, which results in a more compact and efficient switch.

Figure 6:
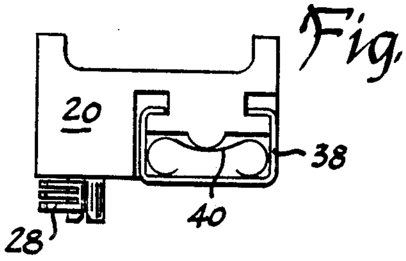
FIG. 6 is an elevational view showing the opposite side of the contact carrier block shown in FIGS. 1 and 5 and showing the ON-OFF contact and contact spring.
Figure 7:
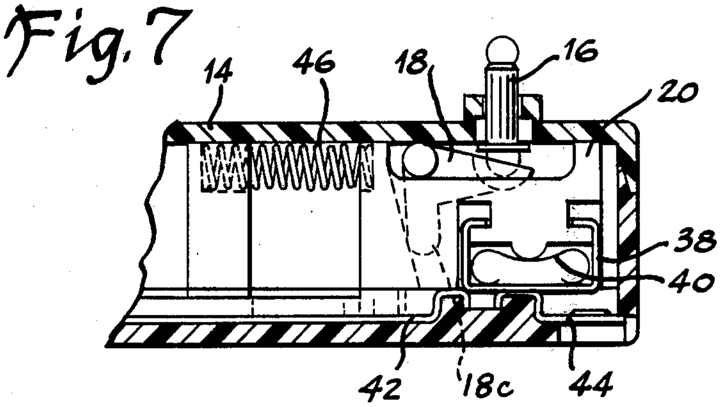
FIG. 7 is a fragmentary longitudinal section taken along the line 7—7 of FIG. 2, showing the trigger in a partially depressed position.

The speed control circuit is one pole of this double-pole switch. The second pole is illustrated in FIGS. 6 and 7, wherein movable contact 38, mounted on block 20 and held in place by spring 40, closes the gap between contacts/terminals 42 and 44 as block 20 moves, as shown in FIG. 7, simultaneously with the closing of the speed control side. These contacts are simply on-off contacts which close the circuit attached to terminal portions **42*a* and 44*a***. This circuit then remains closed as the speed control circuit moves through its range.

When the pressure on trigger 16 is released, a return spring 46 forces block 20 in the direction opposite to that described above, the contacts open, and the switch returns to the position shown in FIG. 1.

While the apparatus hereinbefore described is effectively adapted to fulfill the aforesaid objects, it is to be understood that the invention is not intended to be confined to the particular preferred embodiment of a speed control trigger switch herein set forth, inasmuch as it is susceptible of various modifications without departing from the scope of the appended claims.

What is claimed is:

1. A trigger switch for controlling the speed of a motor, comprising in combination:

a rectangular insulative housing having a trigger protruding from one side in a direction approximately perpendicular to the longest axis of said housing;

contact carrier means linearly movable within said housing by said trigger in a direction perpendicular to the direction of movement of said trigger, and spring-biased against the pressure exerted on said trigger by the user;

a plurality of contact means mounted on said movable carrier means;

a set of stationary contacts mounted in said housing for each of said contact means mounted on said carrier means, such that said contact means slides across said stationary contacts, closing a circuit as said carrier means moves due to pressure on said trigger by the user;

terminal means for connecting said sets of stationary contacts to a source of electric power and to the motor; and a speed control circuit in connection with one of said sets of stationary contacts to provide a trigger speed control circuit capable of variable motor speed control by trigger depression;

said set of stationary contacts which is in connection with said speed control circuit comprising three contacts linearly spaced in the direction of movement of said contact carrier means, said speed control circuit being in connection with the outside two of said three contacts, said outside two contacts being bridged by a respective one of said contact means upon initial movement of said contact carrier means in response to trigger depression, the third contact of said three contacts being located between said outside two contacts and being in direct connection with the motor, said third contact and one of said outside two contacts being bridged by said respective one of said contact means when said contact carrier means is at the limit of movement in response to trigger depression to connect the motor directly to said source of electric power in shunt of said speed control circuit to apply full power directly to the motor being controlled, resulting in maximum speed of the motor.

2. A speed control trigger switch as recited in claim 1 further comprising a motion translation member which includes two leg portions joined at approximately right angles at a pivot point, said trigger resting on one of said legs, such that when said trigger is depressed, said one of said legs pivots about said pivot point, the other of said legs also pivoting, bearing on said contact carrier means, and sliding said carrier means in a direction perpendicular to the motion of said trigger.

3. A speed control trigger switch as recited in claim 2 wherein said speed control circuit includes:

a variable resistor, the value of which varies with the position of said contact carrier means;

a silicon-controlled rectifier;

a chip capacitor connected in circuit with the gate and cathode of said silicon-controlled rectifier.

4. A trigger switch for controlling the speed of a motor, comprising in combination:

a rectangular insulative housing having a trigger protruding from one side;

contact carrier means linearly movable within said housing by said trigger, and spring-biased against movement by said trigger;

a plurality of contact means mounted on said movable carrier means;

a set of stationary contacts mounted in said housing for each of said contact means mounted on said carrier means, such that said contact means slides across said stationary contacts, closing a circuit as said carrier means is moved by said trigger;

terminal means for connecting said sets of stationary contacts to a source of electric power and to the motor;

a speed control circuit in connection with one of said sets of stationary contacts to provide a trigger speed control circuit capable of variable motor speed control by trigger depression;

said set of stationary contacts which is in connection with said speed control circuit comprising three contacts linearly spaced in the direction of movement of said contact carrier means, said speed control circuit being in connection with the outside two of said three contacts, said outside two contacts being bridged by a respective one of said contact means upon initial movement of said contact carrier means in response to trigger depression, the third contact of said three contacts being located between said outside two contacts and being in direct connection with the motor, said third contact and one of said outside two contacts being bridged by said respective one of said contact means when said contact carrier means is at the limit of movement in response to trigger depression to connect the motor directly to said source of electric power in shunt of said speed control circuit to apply full power directly to the motor being controlled, resulting in maximum speed of the motor.

5. A trigger switch for controlling the speed of a motor, comprising, in combination:

a rectangular insulating housing having a trigger protruding from one side thereof, said trigger being linearly depressible in a first direction substantially perpendicular to the longest axis of said housing;

contact carrier means linearly movable within said housing in a second direction substantially parallel to the longest axis of said housing;

motion translating means within said housing operable to drive said contact carrier means in said second direction in response to depression of said trigger in said first direction;

spring means within said housing acting upon said contact carrier means to oppose movement thereof in said second direction responsive to depression of said trigger;

a plurality of movable contact means mounted on said contact carrier means;

a plurality of sets of stationary contacts mounted in said housing, each associated with a respective one of said movable contact means wherein movement of said contact carrier means in response to depression of said trigger slides said movable contact means across the respective set of stationary contacts to bridge said respective stationary contacts;

terminal means for connecting said sets of stationary contacts to a source of electric power and to the motor;

a speed control circuit in connection with one of said sets of stationary contacts operable to increase motor speed as said contact carrier means is moved in said second direction in response to trigger depression;

said set of stationary contacts which is in connection with said speed control circuit comprising three contacts linearly spaced in the direction of movement of said contact carrier means, said speed control circuit being in connection with the outside two of said three contacts, said outside two contacts being bridged by the respective one of said movable contact means upon initial movement of said contact carrier means in said second direction in response to trigger depression, the third contact of said three contacts being located between said outside two contacts and being in direct connection with said motor, said third contact and one of said outside two contacts being bridged by said respective one of said movable contact means when said contact carrier means is at the limit of movement in said second direction in response to trigger depression to connect said motor directly to said source of electric power in shunt of said speed control circuit to apply full power directly to the motor being controlled, resulting in maximum speed of the motor.

* * * * *